US006892021B2

(12) United States Patent
Doerr

(10) Patent No.: US 6,892,021 B2
(45) Date of Patent: May 10, 2005

(54) DYNAMIC GAIN EQUALIZATION ARRANGEMENT FOR OPTICAL SIGNALS

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 142 days.

(21) Appl. No.: 10/245,666

(22) Filed: Sep. 17, 2002

(65) Prior Publication Data

US 2003/0053754 A1 Mar. 20, 2003

Related U.S. Application Data

(60) Provisional application No. 60/322,632, filed on Sep. 17, 2001.

(51) Int. Cl.[7] ............................................... G02B 6/12
(52) U.S. Cl. ........................ 385/140; 385/15; 385/24
(58) Field of Search ............................ 385/15, 140, 2, 385/31, 20, 14, 24

(56) References Cited

U.S. PATENT DOCUMENTS

| | | | | |
|---|---|---|---|---|
| 5,745,618 | A | | 4/1998 | Li ................................ 385/46 |
| 5,881,199 | A | * | 3/1999 | Li ............................... 385/140 |
| 5,953,467 | A | * | 9/1999 | Madsen ........................ 385/15 |
| 6,049,640 | A | * | 4/2000 | Doerr ........................... 385/15 |
| 6,122,414 | A | * | 9/2000 | Shimizu ......................... 385/2 |
| 6,212,315 | B1 | * | 4/2001 | Doerr ........................... 385/31 |
| 6,304,380 | B1 | | 10/2001 | Doerr ......................... 359/484 |
| 6,400,870 | B1 | * | 6/2002 | Hill et al. ...................... 385/39 |
| 6,445,847 | B1 | | 9/2002 | Doerr ........................... 385/24 |

OTHER PUBLICATIONS

H. Y. Kim et al., "Actively Gain–Flattened Erbium–Doped Fiber Amplifier Over 35 nm By Using All–Fiber Acoustooptic Tunable Filters", *IEEE Photonics Technology Letters*, vol. 10, No. 6, Jun. 1998, pp 790–792.

J. E. Ford et al., "Dynamic Spectral Power Equalization Using Micro–Opto–Mechanics", *IEEE Photonics Technology Letters*, vol. 10, No. 10, Oct. 1998, pp 1440–1442.

T. Huang et al., Performance Of A Liquid–Crystal Optical Harmonic Equalizer, *Optical Fiber Communication Conference*, 2001, pp PD29–1—PD29–3.

C. R. Doerr et al., "An Automatic 40–Wavelength Channelized Equalizer", *IEEE Photonics Technology Letters*, vol. 12, No. 9, Sep. 2000, pp 1195–1197.

K. Inoue et al., "Tunable Gain Equalization Using A Mach–Zehnder Optical Filter In Multistage Fiber Amplifiers", *IEEE Photonics Technology Letters*, vol. 3, No. 8, Aug. 1991, pp 718–720.

A. Ranalli et al., "Planar Tapped Delay Line Based, Actively Reconfigurable Gain–Flattening Filter", *European Conference on Optical Communication*, 2000.

(Continued)

Primary Examiner—Karl D. Frech
Assistant Examiner—Daniel A. Hess
(74) Attorney, Agent, or Firm—David A. Sasso; Barry H. Freedman

(57) ABSTRACT

An optical dynamic gain equalization filter (DGEF) comprises a planar arrangement of preferably "perfectly sampled" (or alternatively oversampled) waveguide grating routers (WGR's) connected by individual optical paths each containing a Mach-Zehnder interferometer operated in a push-pull fashion so that a positive phase change in one interferometer arm and a corresponding negative phase change in the other interferometer arm produces a desired change in attenuation while, at the same time, the overall phase of the optical signals after passing through the Mach-Zehnder interferometer is kept constant with respect to the adjacent paths. Alternatively, the above-described arrangement is effectively "cut in half", and its size effectively also reduced accordingly, using a mirror placed at the midpoint of the device and an appropriate circulator to separate the input and output optical signals.

12 Claims, 3 Drawing Sheets

OTHER PUBLICATIONS

B. J. Offrein et al., "Adaptive Gain Equalizer In High–Index–Contrast SiON Technology", *IEEE Photonics Technology Letters*, vol. 12, No. 5, May 2000, pp. 504–506.

C. R. Doerr et al., "Integrated WDM Dynamic Power Equalizer With Potentially Low Insertion Loss", *IEEE Photonics Technology Letters*, vol. 10, No. 10, Oct. 1998, pp. 1443–1445.

C. R. Doerr et al., "Arrayed Waveguie Dynamic Gain Equalization Filter With Reduce Insertion Loss and Increased Dynamic Range", *IEEE Photonics Technology Letters*, vol. 13, No. 4, Apr. 2001, pp. 329–331.

C. R. Doerr et al., "Dynamic Wavlength Equalizer In Silica Using The Single–Filtered–Arm Interferometer", *IEEE Photonics Technology Letters*, vol. 11, No. 5, May 1999, pp 581–583.

A. Sugita et al., "Very Low Insertion Loss Arrayed–Waveguide Grating With Vertically Tapered Waveguides", *IEEE Photonics Technology Letters*, vol. 12, No. 9, Sep. 2000, pp. 1180–1182.

Y. Inoue et al., "Polarization Sensitivity Of A Silica Waveguide Thermooptic Phase Shifter For Planar Lightwave Circuits", *IEEE Photonics Technology Letters*, vol. 4, No. 1, Jan. 1992, pp. 36–38.

F. Koyama et al., "Frequency Chirping In External Modulators", *Journal of Lightwave Technology*, vol: 6, No. 1, Jan. 1988, pp. 87–93.

C. G. P. Herben, "Compact Integrated Cross Connects For Wavelength–Division Multiplexing Networks", Ph.D. Thesis, Delft University of Technology, The Netherlands, 2000.

* cited by examiner

US 6,892,021 B2

DYNAMIC GAIN EQUALIZATION ARRANGEMENT FOR OPTICAL SIGNALS

CROSS-REFERENCE TO RELATED APPLICATION

This application claims priority of Provisional Application Ser. No. 60/322,632 which was filed Sep. 17, 2001.

TECHNICAL FIELD

The present invention relates generally to optical communications, and more particularly to an arrangement suitable for implementation in integrated optics, for providing dynamic gain equalization on multiple wavelength channels in a wavelength division multiplexed (WDM) optical communication system using push-pull Mach-Zehnder interferometers positioned between two waveguide grating routers that are preferably "perfectly sampled".

BACKGROUND OF THE INVENTION

A dynamic gain equalization filter (DGEF) is a device or arrangement that is useful for controlling wavelength-division multiplexed (WDM) channel powers, especially in ultra-long-haul (>100 km) optical communication systems. Presently, there are fiber-based solutions, for example, as described in H. S. Kim, S. H. Yun, H. K. Kim, N. Park, and B. Y. Kim, "Actively gain-flattened erbium-doped fiber amplifier over 35 nm by using all-fiber acousto-optic tunable filters," IEEE Photon. Technol. Lett., Vol. 10, pp. 790–792, June 1998, and bulk-optic-based solutions, as described for example in J. E. Ford and J. A. Walker, "Dynamic spectral power equalization using micro-opto-mechanics," IEEE Photon. Technol. Lett., Vol. 10, pp. 1440–1442, October 1998, and in T. Huang, J. Huang, Y. Liu, M. Xu, Y. Yang, M. Li, C. Mao, and J.-C. Chiao, "Performance of a liquid-crystal optical harmonic equalizer," Optical Fiber Communication Conference, PD29 Jan. 3, 2001.

An integrated waveguide DGEF has also been considered, because of its good spectral resolution, (see, for example, C. R. Doerr, L. W. Stulz, R. Pafchek, L. Gomez, M. Cappuzzo, A. Paunescu, E. Laskowski, L. Buhl, H. K. Kim, and S. Chandrasekhar, "An automatic 40-wavelength channelized equalizer," IEEE Photon. Technol. Lett., Vol. 12, pp. 1195–1197, 2000) as well as its solid-state reliability and large-volume manufacturability, as described in K. Inoue, T. Kominato, and H. Toba, "Tunable gain equalization using a Mach-Zehnder optical filter in multistage fiber amplifiers," IEEE Photon. Technol. Lett., Vol. 3, pp. 718–720, 1991, as well as in A. Ranalli and B. Fondeur, "Planar tapped delay line based, actively reconfigurable gain-flattening filter," European Conference on Optical Communication, 2000 and in B. J. Offrein, F. Horst, G. L. Bona, R. Germann, H. W. M. Salemink, and R. Beyeler, "Adaptive gain equalizer in high-index-constrast SiON technology," IEEE Photon. Technol. Lett., Vol. 12, pp. 504–506, 2000.

A waveguide DGEF can also have a low insertion loss; previously, by putting the lossy wavelength-selective part inside one arm of a large Mach-Zehnder interferometer, it was shown by C. R. Doerr, C. H. Joyner, and L. W. Stulz, "Integrated WDM dynamic power equalizer with potentially low insertion loss," IEEE Photon. Technol. Lett., Vol. 10, pp. 1443–1445, October 1998, that a die loss <2-dB could be achieved. However, because the known design had long dissimilar interfering paths, it required polarization diversity to achieve low polarization-dependent loss (PDL), undesirably making the final device loss at least 4.5 dB and costly. See C. R. Doerr, K. W. Chang, L. W. Stulz, R. Pafchek, Q. Guo, L. Buhl, L. Gomez, M. Cappuzzo, and G. Bogert, "Arrayed waveguide dynamic gain equalization filter with reduced insertion loss and increased dynamic range," IEEE Photon. Technol. Lett., Vol. 13, pp. 329–331, April 2001. Also, a design using a large interferometer is undesirably sensitive to the environment.

SUMMARY OF THE INVENTION

In accordance with the present invention, an optical dynamic gain equalization filter (DGEF) comprises a planar arrangement of preferably "perfectly sampled" (or alternatively oversampled) waveguide grating routers (WGR's) connected by individual optical paths each containing a Mach-Zehnder interferometer operated in a push-pull fashion so that a positive phase change in one interferometer arm and a corresponding negative phase change in the other interferometer arm produces a desired change in attenuation while, at the same time, the overall phase of the optical signals after passing through the Mach-Zehnder interferometer is kept constant with respect to the adjacent paths.

In accordance with an alternative embodiment of the present invention, the above-described arrangement is effectively "cut in half", and its size effectively also reduced accordingly, using a mirror placed at the midpoint of the device and an appropriate circulator to separate the input and output optical signals.

The present invention maximizes the DGEF spectral resolution and minimizes ripple. Driving both arms in a push-pull fashion also reduces the electrical power consumption, polarization dependence, and maintains constant power dissipation. The present invention also takes advantage of the introduction of segmentation in the star couplers that are included in the waveguide grating routers, which decreases the loss of the wavelength-selective part to a value low enough to abandon the known large interferometer approach in favor of an approach that achieves low PDL directly, thus saving significant loss and cost.

BRIEF DESCRIPTION OF THE DRAWINGS

The present invention will be more fully appreciated by consideration of the following detailed description, which should be read in light of the drawing in which.

DETAILED DESCRIPTION

Figure 1:
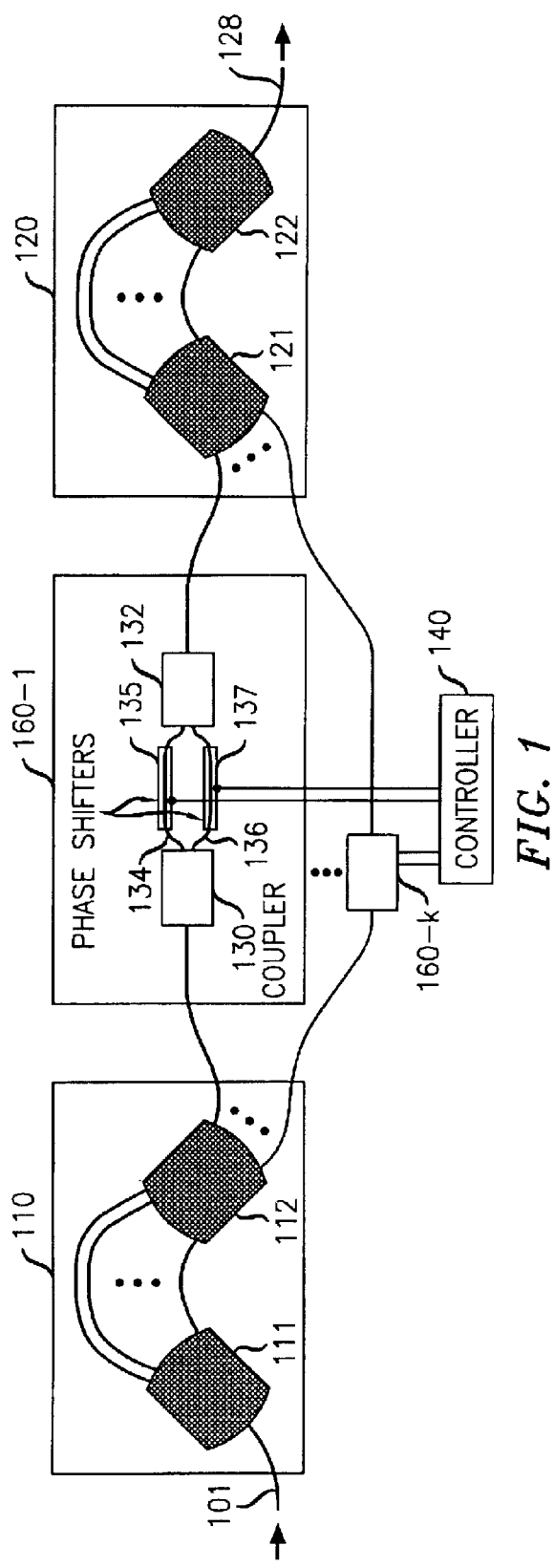
FIG. 1 is a diagram of arrangement of a DGEF in accordance with the present invention, having a push-pull Mach-Zehnder variable optical attenuator for each wavelength channel.

Referring first to FIG. 1, there is shown a diagram of an arrangement of a DGEF in accordance with the present invention, having a push-pull Mach-Zehnder variable optical attenuator 160-1 to 160-k for each of k wavelength channels. For convenience, only attenuator 160-1 and its associated couplers are shown in detail in FIG. 1. A WDM input signal on input 101 is applied to a first waveguide grating router (WGR) 110 that includes a pair of interconnected star couplers 111 and 112. Preferably, the waveguide grating arm inlets of coupler 112 exactly fill the Brillouin zone of the lens inlets, thereby achieving "perfect spectral sampling". This can be best accomplished by employing an exponential lens-inlet-center-wavelength spacing so that the sampling is perfect for all lens inlets, and in turn enables the k outputs of star coupler 112 to cumulatively have a ripple-free spectrum. See C. R. Doerr, M. Cappuzzo, E. Laskowski, A. Paunescu, L. Gomez, L. W. Stulz, and J. Gates, "Dynamic wavelength equalizer in silica using the single-filtered-arm interferometer," IEEE Photon. Technol. Lett., Vol. 11, pp. 581–583, May 1999 or "Apparatus And Method For Achieving A Smooth Spectral Response Optical Filter", U.S. Pat. No. 6,445,847.

Each of the k outputs of waveguide grating router 110 is applied to a corresponding Mach-Zehnder interferometer 160-1 to 160-k. For convenience, the details of only interferometer 160-1 are shown in FIG. 1. The optical signal input to Mach-Zehnder interferometer 160-1 is applied via a first coupler 130 to the two interferometer arms 134, 136, each arm having a respective thermo-optic phase shifter 135, 137. The outputs of each interferometer arm are recombined in a second coupler 132 to produce the interferometer output. The interferometer is operated in a push-pull fashion, under the control of a control signal generated by a controller 140, in a manner such that a positive phase change in one interferometer arm has a corresponding negative phase change in the other interferometer arm. As a result, a desired change in attenuation of the interferometer output is produced, while, at the same time, the phase of the optical signals at the output of interferometer 160-1 is kept constant relative to the outputs of the other interferometers 160-2 through 160-k.

Still referring to FIG. 1, the outputs of interferometers 160-1 to 160-k, containing all of the k wavelength channels, are applied to individual inputs of a second waveguide grating 120, which comprises star couplers 121 and 122. WGR 120 combines (multiplexes) the k individual signals into a WDM signal on output 128. As with star coupler 112, star coupler 122 is preferably arranged so that its waveguide grating arm inlets exactly fill the Brillouin zone of the lens inlets, thereby achieving "perfect spectral sampling".

Couplers 130 and 132 can be of many types, including y-branch couplers, directional couplers, star couplers, and multimode interference couplers. Advantageously, in accordance with an aspect of the present invention, couplers 130, 132 can have different coupling ratios.

Note here that as an alternative to the "perfect sampling" arrangement thus described, "over sampling" may instead be used. With oversampling, the cumulative spectrum is ripple-free, like with perfect sampling, but the DGEF spectral resolution is reduced over that of the case of perfect sampling, keeping all other parameters are the same.

To mitigate dynamic PDL, and also reduce static PDL, Mach-Zehnder interferometers 160 can be asymmetric in both dimensions. Alternatively, the interferometer can have an extra path length, giving a phase bias of $\phi_0$, in one arm.

Figure 2:
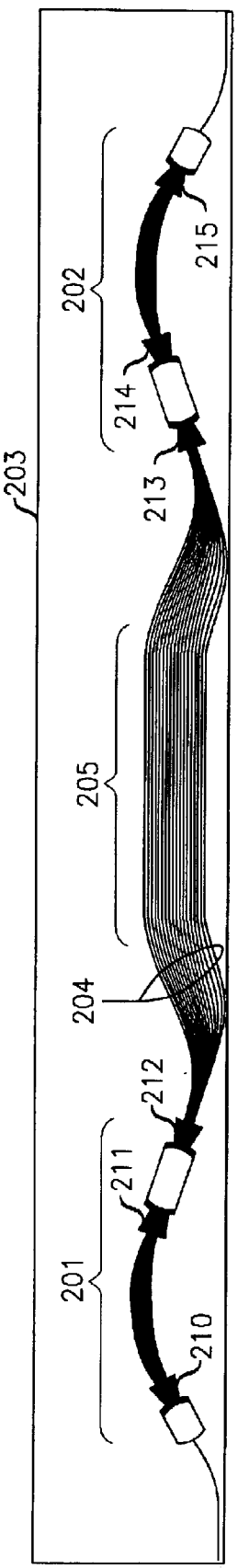
FIG. 2 is a block diagram illustrating one possible waveguide layout for the DGEF shown in FIG. 1.

One embodiment of an actual silica waveguide layout of the DGEF shown conceptually in FIG. 1, is depicted in FIG. 2. This embodiment includes two perfectly sampled silica WGR's 201 and 202 with an index contrast of 0.65% on a silicon substrate 203. The WGR's are connected by a waveguide lens array 204 containing Mach-Zehnder variable attenuators 205. In the design presented in FIG. 2, there are 16 lens arms, and the grating has 28 arms. There are 16 control bands across the C-band with an average spacing of 2.4 nm. Each of the 16 lens arms contains a Mach-Zehnder interferometer with a thermooptic phase shifter on each arm to control the attenuation therethrough. All of the lens arms have the same length to within a wavelength, so there is negligible chromatic dispersion.

To minimize insertion loss, it is preferable to use segmentation in all six waveguide array connections 210–215 to free-space regions. Segmentation consists of strips of core running perpendicular to the waveguides with a constant center-to-center spacing but a progressively decreasing width as the waveguides move further from the free-space regions. See Y. P. Li, "Optical device having low insertion loss," U.S. Pat. No. 5,745,618, Apr. 28, 1998. Vertical tapering, as described in A. Sugita, A. Kaneko, K. Okamoto, M. Itoh, A. Himeno, and Y. Ohmori, "Very low insertion loss arrayed-waveguide grating with vertically tapered waveguides," IEEE Photon. Technol. Lett., Vol. 12, pp. 1180–1182, September 2000, can be used instead, but segmentation is more advantageous because it requires no special processing or special masks.

A DGEF must have a very low polarization-dependent loss (PDL), typically <0.3 dB. There are two main methods to achieve such a low PDL in an integrated optics device. One is to use polarization diversity, i.e., only one polarization is used in the circuit, by using a polarization splitter and a circulator (See "Reducing polarization dependency of optical apparatus," U.S. Pat. No. 6,304,380). The second is to carefully design the entire optical circuit so as to have low PDL over its operating range. The next few paragraphs describe this latter method.

The main goal was to achieve low PDL, <0.3 dB, for an attenuation range of 0 to 10 dB without using polarization diversity. There were both static and dynamic PDL issues to address. The static PDL comes mainly from narrow waveguides, needed to strip off higher order modes and make robust directional couplers. Transverse-magnetic (TM) -polarized light [it is actually quasi-TM, likewise with transverse-electric (TE)] has a wider mode than TE, primarily because of the strain from the silicon substrate. Then, most likely because of a higher propagation loss in the upper cladding than the core, most WGR's have a slightly higher loss by ~0.2 dB for TM-polarization than TE. The dynamic PDL comes from the fact that standard thermooptic phase shifters are ~5% more efficient for TM-polarized light than TE. See Y. Inuoe, K. Katoh, and M. Kawachi, "Polarization sensitivity of a silica waveguide thermooptic phase shifter for planar lightwave circuits," IEEE Photon. Technol. Lett., Vol. 4, pp. 36–38, January 1992. This is related to the fact that the waveguide can thermally expand more vertically than horizontally, creating birefringence. If the Mach-Zehnder interferometers were designed in the usual fashion, with both arms of equal length and a tunable phase shifter in one, the PDL would be 1.8 dB at 10-dB attenuation (see FIG. 3).

To mitigate the static PDL, we took advantage of the mutual coupling among the lens inlets. Because TM has a wider mode, it has a stronger coupling between adjacent waveguides. Because the WGR's are perfectly sampled, there is significant mutual coupling among the lens inlets. TM-polarized light needs a stronger phase correction in the grating arm lengths than TE to correct for the aberrations. We choose the phase correction to be optimum for TM, thus increasing the loss ~0.1 dB per WGR for TE.

To mitigate the dynamic PDL, and also the rest of the static PDL, we made the Mach-Zehnder interferometers asymmetric in both dimensions. Each attenuator consists of two directional couplers and two phase shifters, as shown in FIG. 2. For the same reason that the mutual coupling in the waveguide arrays is stronger for TM, the coupling in directional couplers is stronger for TM (eigenmode speed difference is about 5% higher for TM). So, as stated above, we use the interferometer in a push-pull fashion, i.e., there is one phase shifter on each arm of the interferometer, and the interferometer has an extra path length, giving a phase bias of $\phi_0$, in one arm. Push-pull switches are common in LiNbO3 modulators for chirp reduction, as described, for example, in K. Koyama and K. Iga, "Frequency chirping in external modulators," J. Lightwave Technol., Vol. 6, p. 87, 1988. These switches were also recently used in InP for size reduction, as indicated in C. G. P. Herben, Compact Integrated Cross Connects for Wavelength-Division Multiplexing Networks, Ph.D. Thesis Delft University of Technology, the Netherlands, 2000. One phase shifter increases the attenuation, while the other decreases it. Thus the largest phase shift required by each phase shifter is significantly less, reducing the dynamic PDL. To further reduce the dynamic PDL, we chose the two couplers to have different coupling ratios. The reason is as follows: when the phase shifter that increases attenuation is driven, the TM phase increases faster, and thus increasing the TM loss faster than TE, causing PDL. However, by making the two couplers different, the maximum attenuation is finite. Because TM has a stronger coupling ratio, the difference in coupling ratio between the two couplers is greater for TM, and so the maximum attenuation is reduced for TM, reducing the PDL. The drawback to push-pull operation is that twice as many electrical leads and controls are required, and the drawback to using dissimilar couplers is that the dynamic range is finite.

Figure 3:
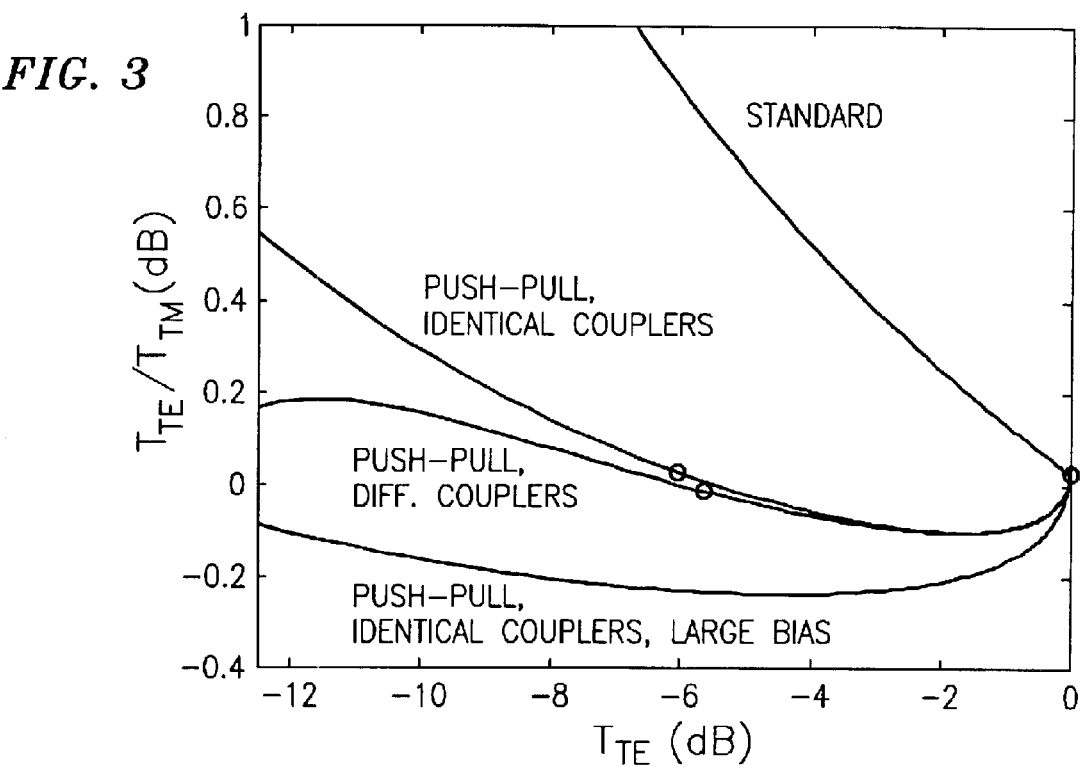
FIG. 3 is a graph of calculated PDL vs. attenuation of three different Mach-Zehnder interferometer designs.

The transmissivity through each switch for TE is $$T_{TE}=|\sin(\theta_1)\cos(\theta_2)+\cos(\theta_1)\sin(\theta_2)\exp(j\phi-j\phi_0)|^2 \quad (1)$$

and for TM is $$T_{Tm}=|\sin(1.05\theta_1)\cos(1.05\theta_2)+ \cos(1.05\theta_1)\sin(1.05\theta_1)\sin(1.05\theta_2)\exp(j1.05\theta-j\theta_0)|^2 \quad (2)$$

Where $\theta_1$ and $\theta_2$ are the coupling angles for TE. FIG. 3 shows plots of $T_{TE}/T_{TM}$ vs. $T_{TE}$ for the conventional case of non-push-pull ($\Phi_0=0$ and $\theta_1=\theta_2=45°$), two cases of push-pull with identical couplers ($\theta_1=\theta_2=45°$) but different bias points ($\Phi_0=120°$ and 160°), and the case we used here—push-pull with dissimilar couplers—($\Phi_0=120°$, $\theta_1=45°-5.2°$, and $\theta_2=45°+5.2°$). Note that the first three cases could also use y-branch couplers instead of directional couplers with nearly the same results. As one can see, the case of dissimilar couplers significantly reduces the PDL in the 0 to 10-dB attenuation range. The case of identical couplers but large $\Phi_0$ has nearly as low PDL, and in fact the dissimilar coupler case can be further improved with a larger $\Phi_0$; but a large $\Phi_0$ means that the attenuation level is high in the case of a device power failure, and the electrical power consumption is high (see below).

Employing push-pull has four advantages in addition to reducing the PDL. First, the spectral resolution is finer for the DGEF. This is because with push-pull one can keep the relative phase between adjacent control bands equal to zero by driving with a constant total power to the two phase shifters per band. Suppose all of the control bands are in phase and at minimum attenuation. Then suppose that one control band is attenuated. The phase between it and its neighbors will not affect the depth of the dip much, but the walls of the dip will sag more if the bands are not all in phase, broadening the resolution. For example, if the dip is 2-dB deep, then the 1-dB stop bandwidth is 2.7 nm for the push-pull case and 3.3 nm for the single-drive case for the device presented here. This effect is significant only for small attenuations relative to neighbors. Second, the worst-case power consumption is reduced by as much as a factor of two. This is because the required phase-shift excursion is reduced. Third, the total power consumption is always constant if the phases are maintained as mentioned above, aiding thermal management. Fourth, it allows for fine tuning of the relative phases between adjacent lens arms, minimizing ripple and PDL.

Figure 4:
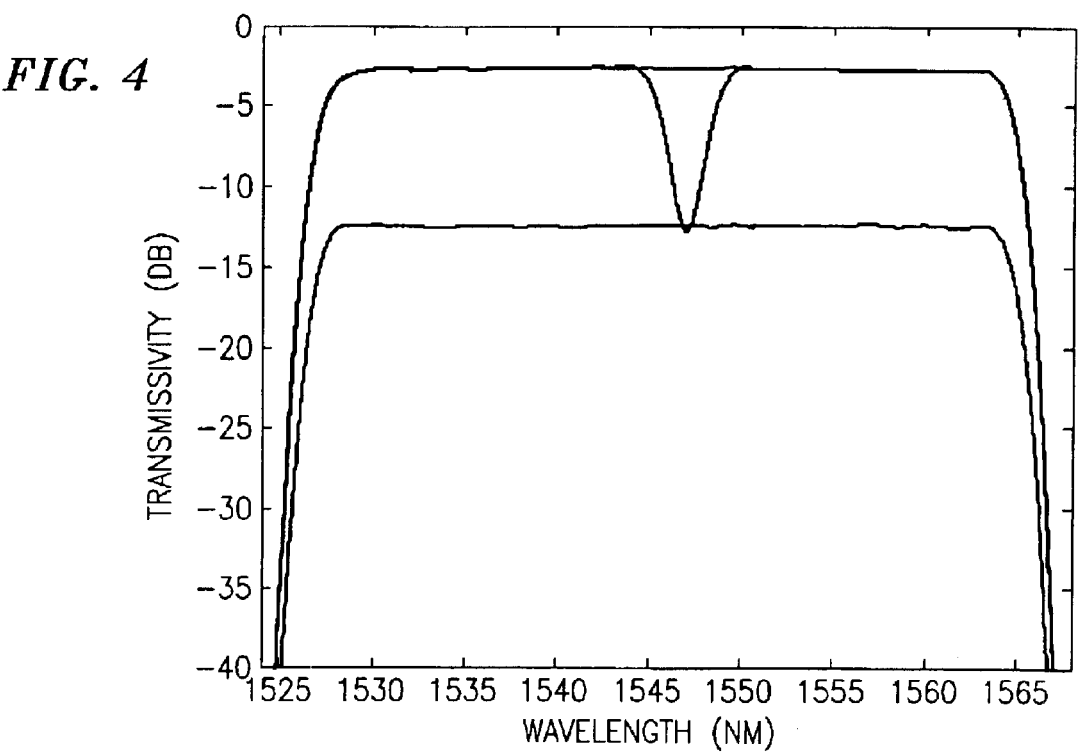
FIG. 4 is a graph of measured transmissivity of the packaged DGEF for three cases: all 16 attenuators at minimum attenuation, all at 10-dB attenuation, and all at minimum attenuation except for one at 10-dB attenuation.

In experiments relating to the present invention, the die initially had a polarization-dependent wavelength shift of ~0.2 nm due to strain birefringence. The shift was eliminated by post-processing the two waveguide gratings. This increased the loss for both polarizations by ~0.8 dB. The die was then fully packaged with one input fiber, one output fiber, and 32 electrical drives. The fiber-to-fiber transmissivity, including one connector, for the cases of all control bands at minimum attenuation, all at 10-dB attenuation, and only one at 10-dB is shown in FIG. 4. As one can see, the insertion loss, including one connector, is less than 2.8 dB over the C-band. The worst-case power consumption is <5 W, neglecting the control electronics. The maximum attenuation range is 14.4 dB. We measured the PDL using a tunable laser, polarization controller, and a power meter at the edges and center of the band under various DGEF states. At minimum attenuation, the PDL is 0.21, 0.19, and 0.17 dB from left to right, and at 10-dB attenuation, the PDL is 0.70, 0.60, and 0.69 dB. The PDL on the slope of the dip of FIG. 3 was measured, and it was less than 0.50 dB. The PDL appears to be aligned to the axes of the die and is always showing TE with the lower loss. Thus if a static PDL device of 0.45 dB is attached to the DGEF, the PDL can be reduced to 0.25 dB.

However, to avoid any extra external components, $\Phi_0$ turned out to be ~105° instead of the designed 120°, greatly increasing the PDL at 10-dB attenuation. Also, $\theta_1$ and $\theta_2$ turned out to be too large, further increasing the PDL.

This integrated silica waveguide filter has <2.8 dB fiber-to-fiber loss, <0.2-dB polarization-dependent loss at minimum attenuation and <0.7-dB at 10-dB attenuation, and <5.0 W electrical power consumption over the C-band.

Figure 5:
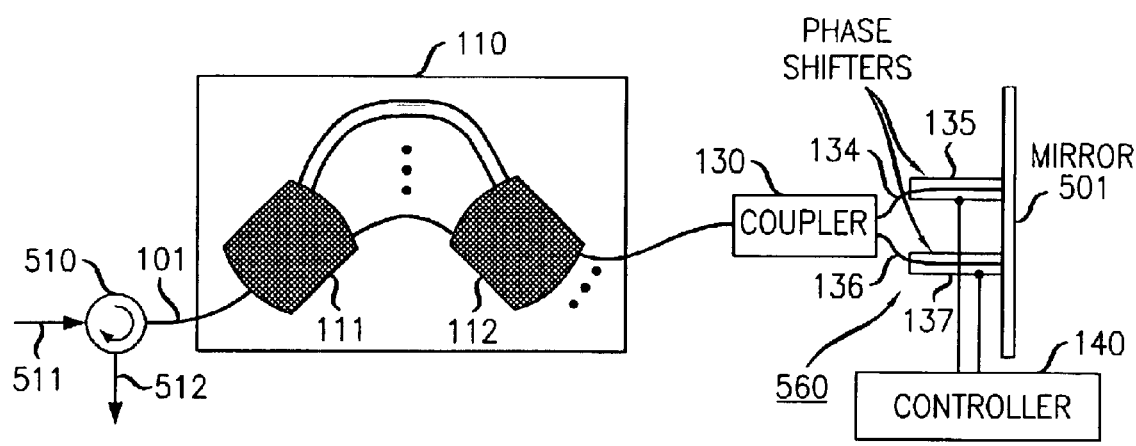
FIG. 5 is a block diagram of an alternate embodiment of the present invention in which the arrangement of FIG. 1 is effectively "cut in half", and its size effectively also reduced accordingly, using a mirror placed at the midpoint of the device and an appropriate circulator to separate the input and output optical signals.

As an alternative to the arrangement shown in FIG. 1, that arrangement can be effectively "cut in half", and its size effectively also reduced accordingly, as shown in FIG. 5. Here, a mirror 501 is placed at the midpoint of the Mach-Zehnder device designated generally at 560. The remaining components are the same, and retain the same numbering as in FIG. 1. An appropriate optical circulator 510 is used to separate the input optical signal on input 51 and the output optical signal on output 512.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical dynamic gain equalization filter (DGEF) comprising two waveguide grating routers (WGR's) interconnected by a plurality of waveguides each containing a Mach-Zehnder interferomater, each of said Mach-Zehnder interferometers comprising first and second attenuator arms each having a controllable phase shifter, characterized in that said WGRs are arranged to perfectiy sample or over sample the optical signals applied to said WGR's, and said Mach-Zehnder attenuator arms are driven in a push-pull fashion, such that a positive phase change in one interferomater arm is accompanied by a corresponding negative phase change in the other interferometer arm.

2. The invention defined claim 1 wherein each of Mach-Zehnder interferometers includes a first coupler for applying a portion of an input optical signal to each of said interferometer arms, and a second coupler for combining the outputs of each of said interferometer arms to form the output of said Mach-Zehnder interferometer.

3. The invention defined in claim 2 wherein at least one of said couplers has an unequal coupling ratio.

4. The invention defined in claim 1 wherein each of said WGR's comprises interconnected first and second star couplers.

5. The invention defined in claim 4 wherein waveguides interconnecting said star couplers are segmented.

6. The invention of claim 1 wherein said input optical signal is oversampled such that the wavelengths of said portions of said input optical signal coupled into each of a plurality of individual paths overlap.

7. An optical dynamic gain equalization filter (DGEF) comprising a first waveguide grating router (WGR) arranged to couple a portion of an input optical signal into each of a plurality of individual paths, and a Mach-Zehnder interferometer operated in a push-pull fashion disposed in each of said optical paths so that a positive phase change in one interferometer arm and a corresponding negative phase change in the other interferometer arm produces a desired change in attenuation while, at the same time, the overall phase of the optical signals passing through each Mach-Zehnder interferometer is kept constant with respect the optical signals passing through other ones of said Mach-Zehnder interferometers.

8. The invention of claim 7 including a second WGR arranged to combine the outputs of each of said Mach-Zehnder interferometers to form a multiplexed output signal.

9. The invention of claim 7 wherein said first waveguide grating router (WGR) is arranged to oversample said input optical signal.

10. The invention of claim 7 wherein said first waveguide grating router (WGR) is arranged to perfectly sample said input optical signal.

11. An optical dynamic gain equalization filter (DGEF) comprising a waveguide grating router, a circulator for applying a wideband input optical signal to said WGR to produce a plurality of individual optical signals having different wavelengths, a plurality of waveguides for applying each of said individual optical signals to a corresponding Mach-Zehnder interferometer, each of said Mach-Zehnder interferometers comprising first and second arms each having a controllable phase shifter driven in a push-pull fashion, such that a positive phase change in one interferometer arm is accompanied by a corresponding negative phase change in the other interferometer arm, and a mirror for reflecting the signals in said first and second arms in each of said Mach-Zehnder interferometers back through said plurality of waveguides and said WGR to produce a combined optical signal.

12. The invention of claim 11 wherein said output signal is coupled from said WGR to said circulator.

* * * * *